June 13, 1972     E. W. BIEDERMAN, JR     3,669,701
LIGHTWEIGHT CEMENTS FOR OIL WELLS
Filed Oct. 29, 1970     2 Sheets-Sheet 1
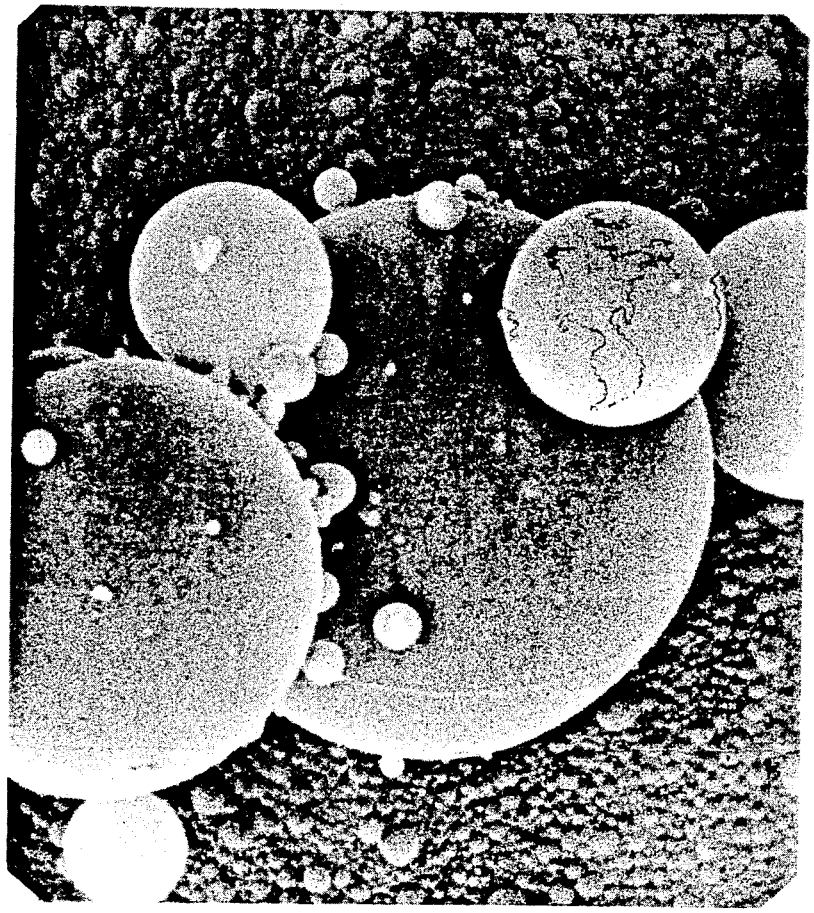
FIG. I
EDWIN W. BIEDERMAN, JR.,
INVENTOR.
BY 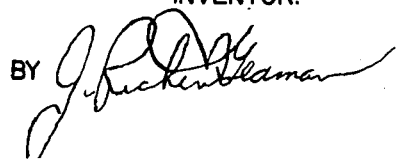

EDWIN W. BIEDERMAN, JR.,
INVENTOR.

BY

United States Patent Office

3,669,701
Patented June 13, 1972

3,669,701
LIGHTWEIGHT CEMENTS FOR OIL WELLS
Edwin W. Biederman, Jr., Highstown, N.J., assignor to Cities Service Oil Company, Tulsa, Okla.
Filed Oct. 29, 1970, Ser. No. 85,050
Int. Cl. C04b 7/24, 7/34
U.S. Cl. 106—120                                  4 Claims

ABSTRACT OF THE DISCLOSURE

Disclosed herein is a lightweight cement which utilizes small cenospheres primarily consisting of silica-alumina. This material known as float ash is essentially that portion of fly ash that floats on water and has a specific gravity around 0.7. The lightness of float ash and its inherent compressive strengh make it desirable as an ingredient for decreasing the weight and improving the strength of oil well cements.

BACKGROUND OF THE INVENTION

The present invention relates to the formulation of lightweight cements for oil wells. More particularly, the present invention discloses an oil well cement composition utilizing hollow cenospheres of float ash which is produced from fly ash, the effluent from coal fired power plants.

In general, various materials may be utilized for making cement which, upon burning, will give the proper chemical compositions for the formation of the calcinated cement. But economically, the number of such materials is sharply limited. The principle materials and sources of calcarious components are limestone, cement rock, chalk, marrow, marine shells and alkali waste. However, certain constituents have been found to be undesirable in cement, and limit still further the source deposits of calcarious components which are satisfactory.

When cement is mixed with water, a slurry or cement paste is formed that hardens on standing into a neat cement. Neat cement injected into an oil well must have the necessary composition so that lost circulation is not encountered in zones which exhibit a high permeability to the cement, for example the cementing of an intermediate drilling string in a porous formation. This problem is especially acute in the Gulf Coast area where exploration and drilling is continuing at a rapid pace and in which many of the formations penetrated by the drill bit lack the strength necessary to support further drilling operations. In weak zones, fluid is lost to the formation and the cement job cannot be completed. The solution is the utilization of a light weight cement having a high strength and low water content so that it exhibits a uniform composition throughout its circulation.

In order to manufacture a light weight cement, it is normally necessary to add more water. However, the mere addition of water tends to reduce strength of the cement beyond tolerable limits. Bentonite is frequently used as one way of decreasing the overall density of the cement. Bentonite readily absorbs the additional water, thereby preventing its loss to the formation. Diatomaceous earth, gilsonite, and expanded and unexpanded perlite are also incorporated in cements to provide weight reduction. The inherent problem with all the ingredients mentioned above are that they, with the exception of expanded perlite, exhibit a specific gravity greater than water and, therefore, are not weight reducers. Expanded perlite, exhibits a desirable specific gravity of less than one; on the other hand, is quite expensive and has a popcorn type texture which reduces strength of the cement. What is required is a cement which may be utilized in oil wells which has a high strength, but low weight, so that intermediate drilling strings may be set without lost circulation.

It is an object of the present invention to provide a light weight cement for oil wells.

It is a further object of the present invention to utilize the unique float ash material contained within fly ash produced from coal fired power plants in order to form a light weight cement for oil wells.

It is still a further object of the present invention to utilize float ash, produced simultaneously with fly ash from coal fired power plants, to form a high strength-light weight cement for utilization in oil well completions.

With these and other objects in mind, the present invention may be more fully understood with particular reference to the accompanying drawings and description.

SUMMARY OF THE INVENTION

The objects of the present invention are accomplished by the use of a lightweight cement for oil wells consisting essentially of calcium oxide and hollow cenospheres of float ash which predominantly consist of silica-alumina. Generally, the concentration of the calcium oxide is about 40% to about 90% by weight of the cement. The concentration of float ash is in proportionate amounts of about 10% to about 60% by weight of the cement in comparison with the calcium oxide. It is preferred that the float ash be obtained from fly ash from a coal fired power plant.

The lightweight cement for oil wells which consists of a calcium oxide and hollow cenospheres of float ash, predominantly silica-alumina, may further consist of silicon dioxide. It is preferred that the ratio of calcium oxide to silicon dioxide be about one to one for adequate chemical bonding of the cement. Within the present invention, lightweight oil well cements may also be formed by the addition of float ash, as aggregate, to existing oil well cements.

BRIEF DESCRIPTION OF THE DRAWINGS

The present invention may be more fully understood by referral to the following drawings in which:

FIG. 1 is a photomicrograph showing float ash cenospheres at one thousand times normal size.

DETAILED DESCRIPTION OF THE INVENTION

Figure 2:
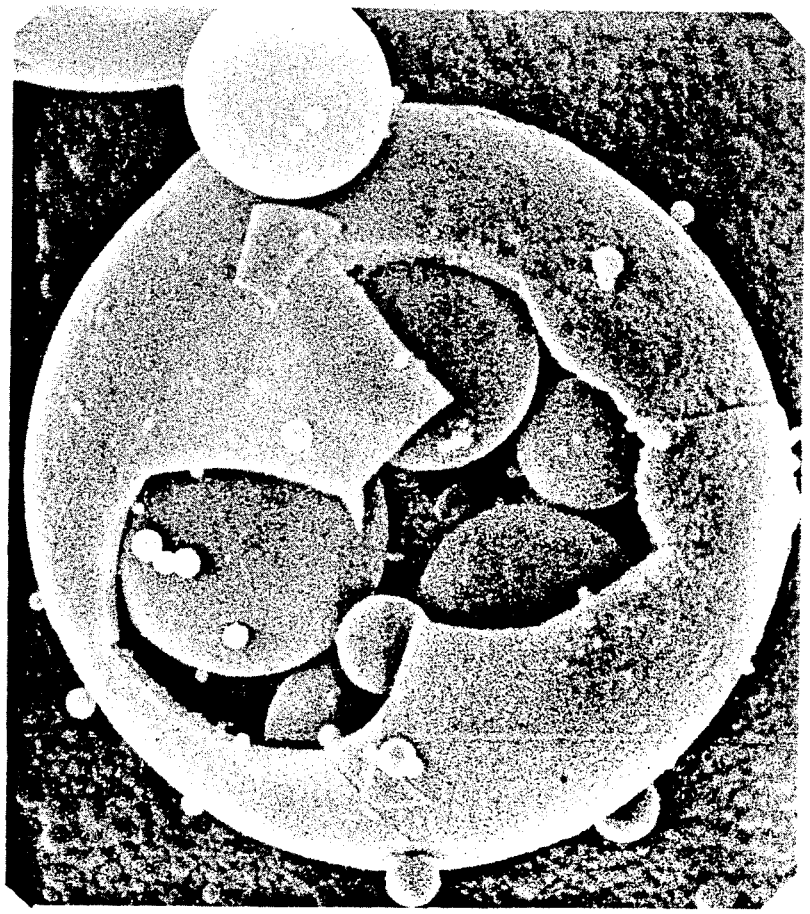
FIG. 2 is a photomicrograph showing float ash cenospheres having cenospheres therein at one thousand times normal size.

It has been conclusively established that the grading of sand causes wide variations of strength properties in concrete. Many attempts have been made to develop an ideal or desirable aggregate grading based upon the maximum density of aggregate content so that maximum quantities of solid particles may be packed into a concrete mix resulting in a high strength, and therefore better cement. Of course, the optimum grading of particle size for a cement mixture would be a spherical aggregate which will allow close packing of the materials and, therefore, a high strength cement to result therefrom.

The composition of the present invention disclosed herein is a light weight cement for oil well use. The cement consists essentially of calcium oxide, the major constituent of all cements, and cenospheres of float ash which are predominantly composed of silica-alumina. The cenospheres of float ash have a high strength to weight ratio, thereby affording a high strength to the cement and allowing a greater amount of cement to be placed within a well for a given pressure differential, thereby providing excellent cementing characteristics. The composition of the present invention is readily available for use in areas where exploration and development drilling penetrates formations which lack the necessary strength to hold a conventional cementing operation, due to a high formation porosity and resulting high fluid loss from the cement. Frequently, lost circulation is encountered in a zone where one wishes to cement an intermediate drilling string. In adequate cement job inhibits the capability of boosting subsequent drilling mud weights downhole. Although weak formations will not allow conventional cementing, due to the loss of fluid into the formation and the creation of an incomplete cement job, these formations may be cemented by the use of the cement composition and cementing process of the present invention. Therefore, the solution to lost mud circulation is the creation of a light weight cement so that the weight of the cement will not destroy the formations and which has a high strength and relatively low water content.

Normally, to create a lightweight cement one adds more water to the cement mixture, whereupon the addition of water tends to reduce strength beyond tolerable limits. Therefore, materials are frequently utilized to decrease the overall density of the cement while they also absorb the water added. As mentioned, diatomaceous earth, gilsonite, bentonite and perlite are often incorporated within cements to provide weight reduction, but none of the above materials give sufficient strength to weight ratios which may be utilized for the particular problems encountered in the intermediate drilling string cementing jobs.

The lightweight cement for oil wells of the present invention consists of the use of cenospheres, preferably of from 50 to 400 mesh, composed primarily of silicon dioxide and aluminum trioxide, known as silica-alumina. The float ash material is essentially that portion of fly ash which floats on water and exhibits a specific gravity of about 0.7. The lightness of the material and its inherent compressive strength make it quite suitable as an additive for decreasing the weight of oil well cements. The material is readily available as it is incorporated in fly ash and is a waste product from coal fired power plants. Millions of tons of this unused material are produced per year, and hence, the overall economics of its use rival any other additive material.

FIGS. 1 and 2 are presented to illustrate the unique structure of the float ash materials. It is noted that the cenospheres are hollow spheres, as depicted in FIG. 1, of high strength silica-almina which impart a high strength to the cement. The float ash cenospheres often contain many cenospheres within a single cenosphere, as shown in FIG. 2. This structural feature imparts great strength to the float ash material within a limited volumetric space. The following table relates the specific gravities of some of the materials utilized in oil well cements. It can be seen that the float ash material has the advantages of being lighter weight. In addition, float ash is relatively accessible where coal fired power plants exist, relatively inexpensive and does not sacrifice strength, in comparison to the competing materials, so that any float ash may be utilized within the concept of the present invention for the forming of the lightweight cements for oil wells. The float ash may be added to existing oil well cements as aggregate in the quantities required to reduce the cement weight, or may be a principal component of the cement mixture.

TABLE

Typical lightweight cement additives

| Additive: | Specific gravity |
|---|---|
| Bentonite | 2.13 |
| Gilsonite | 1.07 |
| Diatomite | 2.0 |
| Float ash | 0.7 |

It is preferred that calcium oxide and the cenospheres of float ash be used in combination such that a predominantly silica-alumina cement is formed. Generally, the concentration of the calcium oxide will be about 40 to about 90 percent by weight with the concentration of float ash being about 10 to about 60 percent by weight silica alumina. Often times, silicon dioxide will be added to the lightweight cement to further strengthen the cement and form a high strength to weight ratio cementing material. When silicon dioxide is utilized, the ratio of calcium oxide to silicon dioxide should be in about a one to one ratio by weight such that complete chemical bond may exist within the cement and so that all the physical bonding capabilities of the calcium oxide, silica-alumina and silicon dioxide components may be utilized. Therefore, through the use of the lightweight cements of the present invention, a cement is provided which has a high strength to weight ratio. A use is provided for cenospheres formed as effluent from coal fired power plants which may be utilized effectively as a cementing material while thereby reducing or depleting quantities of a polluting material from coal power plants.

The present invention has been described herein with respect to particular embodiments thereof. It will be appreciated by those skilled in the art, however, that various changes and modifications may be made without departing from the scope of the invention.

Therefore, I claim:

1. A lightweight cement composition for oil wells consisting essentially of:
   (a) from about 40 to about 90 percent by weight calcium oxide; and
   (b) from about 10 to about 60 percent by weight cenospheres of float ash which predominantly consist of silica-alumina.

2. The composition of claim 1 in which the float ash is obtained from fly ash from a coal fired power plant.

3. The composition of claim 1 further consisting of silicon dioxide.

4. The composition of claim 3 in which the ratio of calcium oxide to silicon dioxide is about one to one by weight.

References Cited

UNITED STATES PATENTS

| 3,076,717 | 2/1963 | Minnick | 106—118 |
| 2,987,408 | 6/1961 | Minnick | 106—Dig 1 |

FOREIGN PATENTS

| 606,810 | 10/1960 | Canada | 106—Dig 1 |

TOBIAS E. LEVOW, Primary Examiner

W. T. SCOTT, Assistant Examiner

U.S. Cl. X.R.

106—85, 86, 118, Dig 1; 166—292